Feb. 14, 1961 J. A. HASTY 2,971,270
DRIVER TRAINING DEVICES
Filed April 18, 1958 2 Sheets-Sheet 1

INVENTOR.
JEROME A. HASTY
BY Henry Heyman

Feb. 14, 1961 J. A. HASTY 2,971,270
DRIVER TRAINING DEVICES
Filed April 18, 1958 2 Sheets-Sheet 2

INVENTOR.
JEROME A. HASTY
BY

United States Patent Office 2,971,270
Patented Feb. 14, 1961

2,971,270

DRIVER TRAINING DEVICES

Jerome Allen Hasty, Box 1543, Santa Fe, N. Mex.

Filed Apr. 18, 1958, Ser. No. 729,317

2 Claims. (Cl. 35—11)

The present invention relates to acceleration-responsive indicators and more particularly to such a device particularly adapted for vehicle driver training.

The techniques for teaching smoothness of control have long been recognized of merit in training pilots of airplanes. Such training not only prevents undue stresses on vehicle structures but it is also of extreme value in training the prospective pilot to prepare for anticipated changes in course well ahead of time in order to prevent violent maneuvers necessitated by late planning. The present invention recognizes that the habit of anticipation would be of extreme value in the operation of automobiles and other road vehicles. A common and continuing problem of instructors in teaching "driving" is that students become rattled when faced with a sudden requirement for altering the course or velocity of an automobile. It is believed that one of the reasons for this result is that the student is at once trying to adjust to the effects of inertia through his physical senses and at the same time respond to oral directions very often administered in a condition of urgency.

The present invention provides a device which inculcates in the novice driver the habit of anticipation which experienced automobile driving instructors believe is the basic essential habit from which all other safe driving habits evolve. The formation and development of the habit of anticipation must be inculcated at the very beginning of the driving experience and be continued until it becomes an instinctive reflex on the part of the driver. The present invention supplies a visual indicator of the extent to which the student is acquiring the technique of planning the next step or steps in the smooth control and operation of a vehicle.

In brief, the present invention is based upon the premise that a fluid in a cup-shaped container influences to an exceedingly helpful degree the student in acquiring smooth control of the vehicle in his desire not to spill the liquid. It follows that the desire to prevent the dashing of the liquid out of the cup requires the student to anticipate situations which otherwise would require abrupt stops and to plan his course ahead of time in order to avoid the necessity for sudden swerving.

It is, accordingly, a prime objective of the present invention to provide an effective visual training device useful for inculcating in prospective automobile drivers the necessary basic safe habits. Other objectives and advantages of the present invention will become apparent as this description proceeds with reference to the drawing in which.

Figure 1:
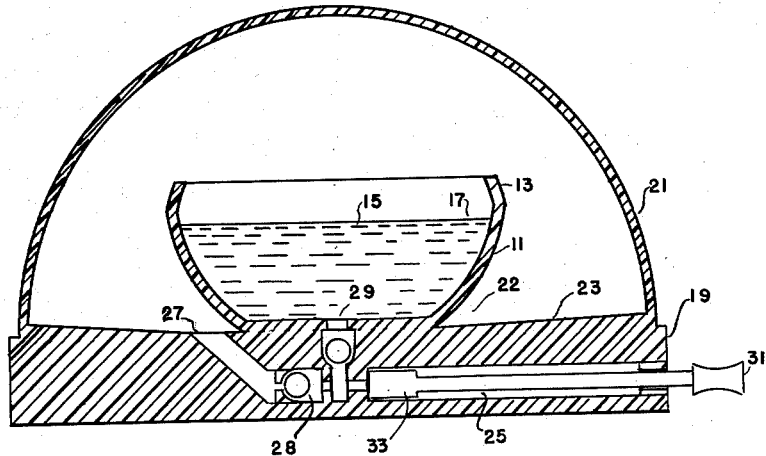
Figure 1 is a first embodiment of a visual training device in accordance with the present invention.

Referring to Figure 1, a transparent cup 11 having inturned upper portion 13, is provided to house a colored fluid 15 which is provided in a quantity which reaches to a selected level 17 which may be indicated by an indicator line. The cup 11 is supported on an inwardly sloping funnel member or dome floor 23 which in turn is affixed to base member 19 which may also be constructed of plastic material, although it need not be transparent. Surrounding the cup 11 and likewise supported on the base is a transparent, preferably hemispherical, dome member 21. This form of the device is particularly applicable for use in the early training of the vehicle driver for the reason that it includes a mechanism for the prompt reinsertion into the cup of spilled liquid as well as the fact that it is provided with the inturned flanged portion 13 such as to reduce its sensitivity. Assuming the student abruptly engages the clutch or fails to anticipate the presence of other vehicles so that a sudden application of the brakes becomes necessary, some or all of the liquid will be sloshed out of cup member 11 into the catch basin 22 provided between the lower portion of the dome member 21, dome floor 23, and the outer surface of cup 11. A pump 25 is provided, having an inlet port 27 communicating with the catch basin 22. An inlet check valve 28 is supported in the pump housing and communicates with the inlet port 27, and an outlet valve 29 is supported in a port which penetrates the lower median surface of the cup 11. By withdrawing pump handle 31 and piston 33 the liquid in the catch basin 22 will be drawn into pump housing and the restoring of the pump plunger to its original in-position forces the liquid back into cup 11.

Figure 2:
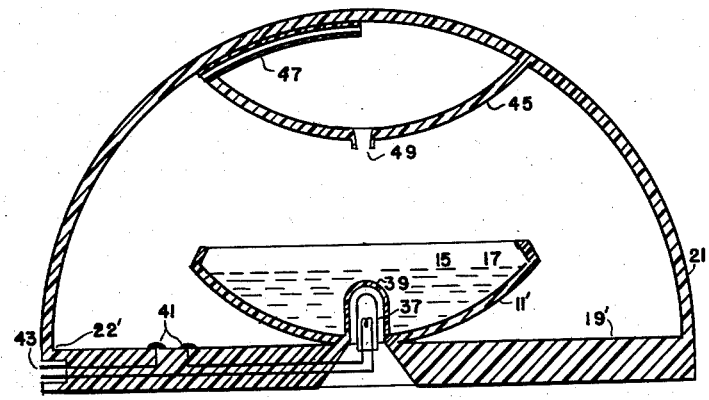
Figure 2 is a second modification including a lamp which is lit when liquid is spilled.

There are many occasions wherein it is not desirable to include the somewhat complex structure of the pump of Figure 1 and to make other provisions for the restoring of the liquid into the indicator cup if it has been spilled. Referring to Figure 2, the cup 11' is provided in the same manner and for the same purpose as that of Figure 1 and contains the colored indicator liquid 15. The cup 11 is supported on a planar base 19' and transparent dome 21 is likewise supported on and sealed to base member 19'. Supported on and sealed to the base member within the housing 21, either in the center of the cup 11' or elsewhere, is a transparent reentrant plastic capsule 39. Lamp bulb 37 is slidably supported in capsule 39 and is connected in series with a pair of contacts 41 affixed to the inner surface of the dome floor, i.e., in the catch basin 22'. An electric socket 43 connects to contacts 41 and lamp 37 thereby permitting the attachment thereto of an electric line leading from the vehicle battery. This embodiment provides an indication of erratic driving to the driver without undue distraction of his attention from the road. The colored fluid 15 is made sufficiently electrically conductive so that as the liquid is spilled the contacts 41 will be bridged and the lamp 37 becomes lit. Located in the apex portion of the dome 21 is a refiller funnel 45. This funnel is provided with a small tube 47 located adjacent the surface of the dome and leading from a point on the outer periphery of the funnel member 45 to a point proximate to the axis of the dome. The funnel member 45 is provided with a small aperture or funnel opening 49 at its center. In the event liquid is spilled from indicator cup 11', the entire trainer device is inverted and the liquid flows into the space between the dome and funnel 45. When the device is restored to its upright position the liquid is then temporarily trapped within the funnel until it can escape out of funnel opening 49 back into cup 11'.

Figure 3:
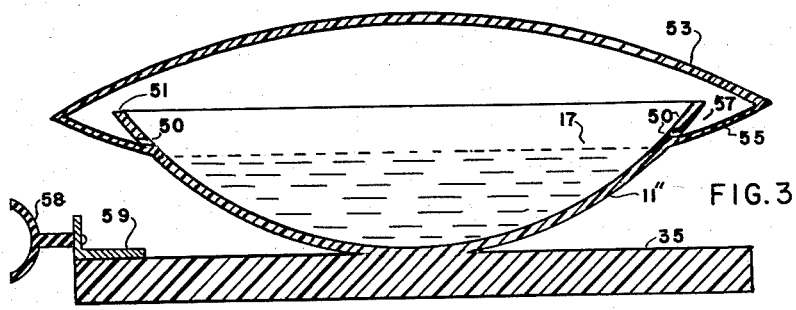
Figure 3 is a third modification.
Figure 5:
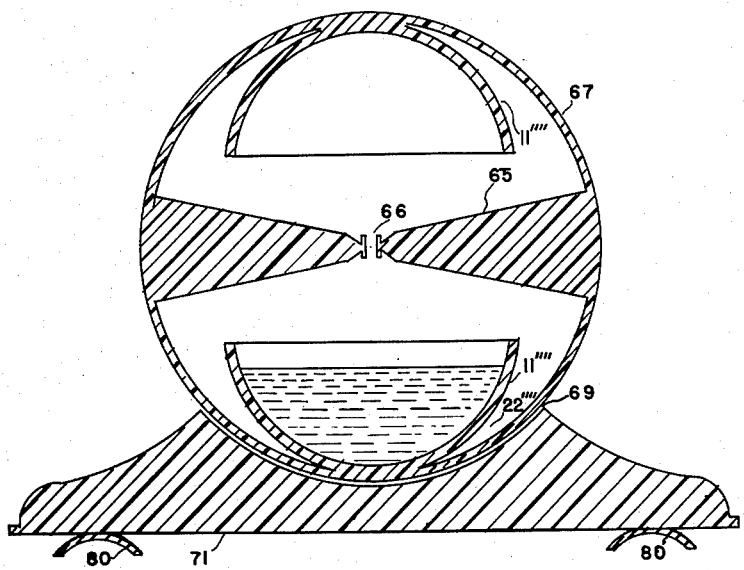
Figure 5 is a fifth modification.

Another embodiment in accordance with the present invention, which is exceedingly simple in form and economical to produce, is shown in Figure 3. This figure provides fluid cup 11" supported on a base member 35 and having a number of small ports 50 on a line immediately above the fluid level line 17. The cup itself extends to an additional level as indicated by the upper rim 51. A dome-oblate-ellipsoid-shaped member 53 extends in spaced relation over the rim 51 of cup 11″ and is sealed to an upwardly convex ring-shaped member 55. The ring-shaped member is sealed at its inner periphery to the wall of cup 11″ substantially at the level of fluid level line 17. If an appreciable amount of fluid is spilled out of cup 11″ by erratic driving into catch basin 57 it will automatically return slowly back into cup 11″ through apertures 50.

Figure 4:
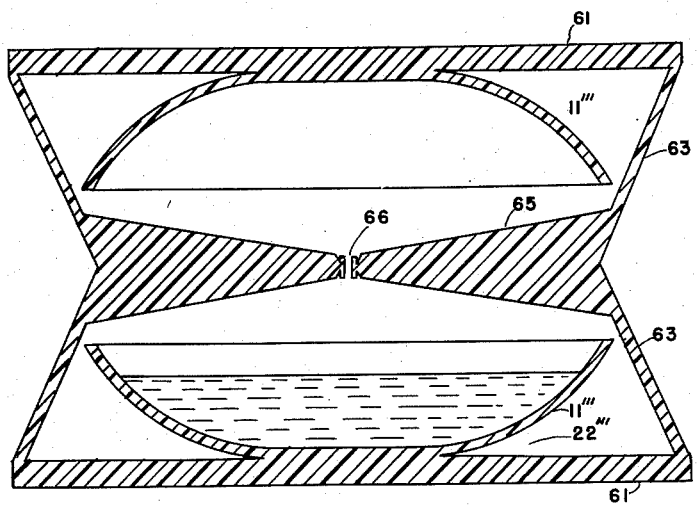
Figure 4 is a fourth modification.

Figure 4 shows still another species in which, although the structure of the device is simple, very little time is required to reset the device for succeeding tests. In this embodiment two opposing fluid cups 11‴ are supported on spaced opposite bases 61. The entire unit is enclosed hermetically by the provision of transparent opposed frusto cones 63, the meeting edges of which are sealed together and the edges of which meet bases 61 and are thereto sealed. An annular outwardly flaring funnel member 65 is affixed at its outer edges to the central portion of joined frusto cones 63. In this embodiment erratic operation of the vehicle results in the spilling of a fluid out of cup 11‴ into catch basin area 22‴ and the resetting simply requires that the training device be picked up and inverted. The liquid from the catch basin will run down the annular funnel member 65 and be directed through funnel opening or spout 66 into the opposite cup which has now become the nether one.

Still another embodiment of the device which is readily adapted to be affixed to an automobile instrument panel or other fixed structure of the vehicle is similar in many respects to that shown in Figure 4 except that the opposing cups 11⁗ and 11⁗ and the annular funnel member 65 is affixed to the interior surface of a transparent spherical closure member 67. The sphere, or ball, 67 is supported in a socket 69 provided on the upper surface of base member 71. In the event liquid is spilled from the lower cup 11⁗ into catch basin 22⁗, the entire spherical assembly is rotated so that upper cup 11⁗ becomes the lower cup and all the liquid flows into this cup through the aperture of funnel 65. The means for attaching the device to the vehicle can be any well-known means such as screw type attachments or suction cups 80 for attaching either to the instrument panel or the windshield.

The foregoing description has described a device having for its purpose the more effective training of vehicle drivers. In brief, its operation depends upon the principle that accelerations of reasonable magnitude do not result in spilling of liquid thereby resulting in the indoctrination in the student of the habits of smooth control and maneuver anticipation. Although I have described five embodiments which fall within the teachings of this invention, it is understood that other variations may be possible and it is intended that this invention be considered limited only by the appended claims taken in view of the prior art.

What is claimed is:

1. A driver trainer accelerometer comprising a transparent spherical housing, a pair of transparent substantially hemispherical vessels each having a size less than that of the housing supported in opposition on the interior wall of said housing with their axes aligned with a single axis of said housing, a transparent annular ring having a central opening and wedge-shaped cross section expanding from the opening to the periphery, being sealed at its outer edges to the inner wall of said housing on a plane at right angles to the axes of said vessels, a colored indicating fluid provided in said housing and being of a selected quantity to fill within a selected level one of said vessels, said housing being adapted to be supported with the axes of said vessels upright in a vehicle whereby said fluid will be contained in the lower of said two vessels, and whereby, if under the influence of abrupt acceleration, some of said fluid is spilled from said vessel into the housing, said housing may be manually inverted whereby said fluid will be funneled by said annular ring into the other of said vessels.

2. A driver trainer accelerometer comprising a transparent substantially spherical housing, at least one transparent cup of substantially hemispherical shape supported with the bottom part of the cup affixed to the interior wall of the housing with its axis aligned with a selected single axis of the housing, a transparent annular ring having a central opening and wedge shaped cross section expanding from the opening to the periphery, being sealed at its peripheral edge to the inner wall of the housing on a plane at right angles to the selected axis of the housing, a colored indicating fluid provided in said housing and being of a selected quantity to partially fill said cup to a selected level, said housing being adapted to be supported with the cup in the bottom portion of the housing and with the axis of the cup upright in a vehicle whereby the fluid will be contained in said cup, and whereby, if under the influence of abrupt acceleration some of the fluid is spilled from said cup into the housing, said housing can be manually manipulated to restore said fluid into said cup.

References Cited in the file of this patent

UNITED STATES PATENTS

| | | |
|---|---|---|
| 2,414,697 | Petersson | Jan. 21, 1947 |
| 2,437,784 | Laskin | Mar. 16, 1948 |
| 2,752,725 | Unsworth | July 3, 1956 |